US008360640B2

(12) United States Patent
Reinhold

(10) Patent No.: US 8,360,640 B2
(45) Date of Patent: Jan. 29, 2013

(54) X-RAY TUBE AND METHOD FOR EXAMINING A TARGET BY SCANNING WITH AN ELECTRON BEAM

(75) Inventor: Alfred Reinhold, Wunstorf (DE)

(73) Assignee: YXLON International GmbH, Hamburg (DE)

( * ) Notice: Subject to any disclaimer, the term of this patent is extended or adjusted under 35 U.S.C. 154(b) by 500 days.

(21) Appl. No.: 12/521,622

(22) PCT Filed: Dec. 28, 2007

(86) PCT No.: PCT/EP2007/011463
§ 371 (c)(1), (2), (4) Date: Jan. 15, 2010

(87) PCT Pub. No.: WO2008/080624
PCT Pub. Date: Jul. 10, 2008

(65) Prior Publication Data

US 2010/0141151 A1 Jun. 10, 2010

(30) Foreign Application Priority Data

Dec. 28, 2006 (DE) ......................... 10 2006 062 452

(51) Int. Cl.
*G01D 18/00* (2006.01)
*H01J 35/14* (2006.01)

(52) U.S. Cl. ........................................ 378/207; 378/137

(58) Field of Classification Search .................. 378/137, 378/207, 114, 115, 116
See application file for complete search history.

(56) References Cited

U.S. PATENT DOCUMENTS

| | | | |
|---|---|---|---|
| 4,524,277 | A | 6/1985 | Shimura et al. |
| 4,631,741 | A | 12/1986 | Rand et al. |
| 4,979,199 | A | 12/1990 | Cueman et al. |
| 5,602,899 | A | 2/1997 | Larson |
| 5,857,008 | A | 1/1999 | Reinhold et al. |
| 6,262,425 | B1 | 7/2001 | Gordon et al. |

(Continued)

FOREIGN PATENT DOCUMENTS

| | | |
|---|---|---|
| DE | 4142143 | 6/1993 |
| DE | 10251635 | 5/2004 |

(Continued)

OTHER PUBLICATIONS

International Search Report for PCT/EP2007/011463, mailed on May 2, 2008.

(Continued)

*Primary Examiner* — Glen Kao
(74) *Attorney, Agent, or Firm* — Leydig, Voit & Mayer, Ltd.

(57) ABSTRACT

The invention relates to an X-ray tube, especially a microfocus X-ray tube (2), comprising means (18) for orienting an electron beam (10) towards a target (4). A control device (20) is used to control the means for orienting the electron beam (10) towards the target (4) in such a way that the electron beam (10) scans the target (4), in addition to a measuring device (22) for measuring the intensity of the target current which flows to different scanning sites when the target (4) is scanned by the electron beam (10), or a measuring variable dependent on the target current, and an evaluation device (24) for associating each measured value of the target flow with the corresponding scanning site. Said X-ray tube enables the easy and economical implementation of a method for checking the operability of the target (4).

14 Claims, 2 Drawing Sheets

U.S. PATENT DOCUMENTS

| | | | | |
|---|---|---|---|---|
| 2001/0028037 | A1 | 10/2001 | Suzuki | |
| 2003/0137314 | A1 | 7/2003 | Kojima | |
| 2004/0091081 | A1 | 5/2004 | Frank | |
| 2004/0208280 | A1* | 10/2004 | Yada et al. | 378/43 |
| 2005/0053197 | A1 | 3/2005 | Radley et al. | |
| 2005/0100133 | A1 | 5/2005 | Reinhold | |
| 2005/0163284 | A1 | 7/2005 | Inazuru | |
| 2005/0213711 | A1* | 9/2005 | Ukita | 378/141 |
| 2007/0051907 | A1 | 3/2007 | Reinhold | |

FOREIGN PATENT DOCUMENTS

| | | |
|---|---|---|
| DE | 10352334 | 6/2005 |
| DE | 102005041923 | 3/2007 |
| EP | 1557864 | 7/2005 |
| GB | 2018507 | 10/1979 |
| JP | 61294745 | 12/1986 |
| JP | 2001319608 | 11/2001 |

OTHER PUBLICATIONS

International Search Report for PCT/EP2007/011464, mailed on Apr. 21, 2008.

* cited by examiner

X-RAY TUBE AND METHOD FOR EXAMINING A TARGET BY SCANNING WITH AN ELECTRON BEAM

This is a U.S. National Phase Application under 35 U.S.C. §171 of PCT/EP2007/011463, filed on Dec. 28, 2007, which claims priority to German Application No. DE 10 2006 062 452.1, filed Dec. 28, 2006. The International Application was published in German on Jul. 10, 2008, as WO 2008/080624 under PCT article 21 (2).

The invention relates to an X-ray tube and a method for examining the target of an X-ray tube.

BACKGROUND

Such X-ray tubes are generally known for example in the form of microfocus X ray-tubes and are used for example to examine printed circuit boards in the electronics industry. The known X-ray tubes include a target which is struck by high-energy-accelerated electrons or other electrically charged particles when the X-ray tube is operating, with the result that X-radiation is produced in generally known manner. The thus-produced X-radiation is used in imaging methods in order for example to represent components or component arrays on printed circuit boards and in this way visually examine the printed circuit boards.

X-ray tubes of the type concerned in the form of microfocus X-ray tubes are known for example through DE 102 51 635 A1 and DE 103 52 334 A1. They include a target and means of directing an electron beam at the target. In such X-ray tubes, the target usually consists of a base body which serves as a mechanical support and also to dissipate electric charges and heat. A layer, provided as a retarding layer, of a target material, in which the striking electrons are slowed, is arranged on the support. The target material is chosen in such a way that, when the electrons strike and are slowed, X-radiation results in a desired wavelength range.

When the high-energy-accelerated electrons strike, only approximately 1% of the energy of the electrons is transformed into X-radiation, while the remaining approximately 99% are transformed into heat. In this way the target is exposed to a strong thermal load stress and subjected to relatively high wear. The wear occurring in this way at the target can lead to a reduction in the quality of the X-ray images produced by means of the X-ray tube, or malfunctions may occur in the X-ray tube. In the case of a deterioration in image quality or of malfunctions, fault diagnosis is time-consuming, and thus costly, in the case of the known tubes. In order to establish whether a malfunction has occurred because, for example, the target is worn away, the casing of the X-ray tube must be opened and the target visually examined This is particularly time-consuming and thus costly.

SUMMARY OF THE INVENTION

An aspect of the present invention is to provide an X-ray tube in which fault diagnosis in the case of malfunctions is made easier and to provide a method for examining a target.

The basic idea underlying the teaching according to the invention is that if the target is worn this reveals itself in a change in the target current that flows when an electron beam is directed at the target. If the target is not worn, striking electrons are slowed in the target layer, with the result that X-radiation results in the desired manner, wherein at the same time a target current flows away from the target which does not exceed a maximum value that depends on the energy of the electrons and the target and support materials used. If, on the other hand, the target layer is worn, with the result that the electrons are no longer slowed in the target layer, but strike the base body, consisting of the support material, of the target, a target current is measured which differs from the target current flowing when the target layer is intact. Whether the target current flowing when the target layer is damaged is higher or lower than the target current flowing when the target layer is intact depends on whether the target material has a higher or lower electron reflection than the support material. If, for example, beryllium is used as support material and tungsten which has a higher electron reflection than beryllium, as target material, a higher target current flows if the target layer is damaged than if the target layer is intact. If, for example, a 100 μA electron current strikes an intact beryllium target layer, ca 20 μA are reflected, while only approximately 80% of the electrons penetrate the tungsten and are measured as current there. If the target layer is damaged, the electron current strikes the beryllium support layer. Because the electron reflection of beryllium is smaller than that of tungsten, in this case only approximately 5% of the striking electrons are reflected, while approximately 95% of the electrons penetrate the beryllium and are measured as current. If the target layer is damaged, an increase in the target current is therefore measured in this case. If, on the other hand, a target material is used that has a smaller electron reflection than the electron reflection of the support material, a smaller target current flows if the target layer is damaged than if the target layer is intact. This is the case for example if beryllium is used as target material and diamond as support material, as the electron reflection in particular of doped diamond materials is clearly higher than the electron reflection of beryllium.

The invention makes use of this effect in that the target is scanned by means of the electron beam and the current intensity of the target current that flows when scanning the target with the electron beam at different scanning sites, or a measurement value dependent on this, is measured, wherein the respective measured value for the target current is allocated to the associated scanning site. According to the invention, the means for directing an electron beam at the target are accordingly driven in such a way that the electron beam scans the target, i.e. strikes the target at different scanning sites in time sequence. The current intensity of the respective flowing target current or a measurement variable dependent on this is measured by a measurement device provided according to the invention. The measurement variable can then be used, for example, in the case of a target in which tungsten is used as target material and beryllium as support material, to establish whether the current intensity of the target current lies below a maximum value which flows in the case of an undamaged target layer. It can be concluded from this that the target layer is undamaged at the associated scanning site.

If, in this case, a current intensity that lies above the maximum value is not measured at any scanning site when the whole surface of the target is scanned, it can be concluded from this that the target layer is not damaged at any of the scanning sites.

If, on the other hand, it is established in this case that the target current lies above the maximum value at individual scanning sites, it can be concluded from this that the target layer has been damaged by wear or in some other way at these scanning sites. In order to avoid malfunctions of the X-ray tube in this case, the target can be replaced. However, it is also possible to deflect the electron beam by means of a deflector present in the X-ray tube in such a way that it strikes a different, undamaged, point on the target when the X-ray tube is in operation.

Fault diagnosis in X-ray tubes is greatly simplified in this way. In particular, time-consuming and therefore costly work steps which result if the X-ray tube is opened to examine the target, although a problem that has occurred is not due to the target being worn, are avoided. On the basis of the teaching according to the invention, it can be recognized whether the target is worn without having to open the X-ray tube.

A particular advantage of the teaching according to the invention is that some of the components and component groups needed to implement it are present in an X-ray tube in any event. This is true in particular of the means for directing an electron beam at the target, which generally include a deflector by means of which the electron beam can be deflected in two dimensions in such a way that it can be directed at different spatial points of the target. Also present where appropriate is a measurement device for measuring the target current at suitable X-ray tubes, such as is known for example from DE 103 52 334 A1. The outlay on equipment for the implementation of the teaching according to the invention is thus relatively small.

By microfocus X-ray tube is meant according to the invention an X-ray tube whose focal spot diameter is $\leqq 200$ μm, in particular $\leqq 10$ μm. So-called nanofocus X-ray tubes are thus also considered to be microfocus X-ray tubes within the meaning of the invention.

The control device according to the invention and the evaluation device according to the invention can be formed by hard—or software depending on the requirements in each case.

According to the invention it is possible in principle to evaluate online the measurement variable measured by the measurement device, for example in the case of a target with tungsten as target material and beryllium as support material by comparison of the measurement variable with a predefined maximum value of the current intensity of the target current and, if this maximum value is exceeded, emission of a signal which shows that the target layer is worn away. With such an embodiment, an examined target can thus be classified as "in order" or "not in order".

An advantageous development of the teaching according to the invention provides that the evaluation device includes a memory for storing target current/scanning site values allocated to each other. With this embodiment it is possible in particular to access the stored values and deduce from them more precise information as to whether and if appropriate at which points the target is worn away. In this way, the state of wear of the target in terms of space can be evaluated in a more differentiated way, in order for example, when the target is worn away at one point, to direct the electron beam at another point on the target when the X-ray tube is operating to produce X-radiation.

In particular if an operator of the X-ray tube is to judge whether the target is worn away or not, it is expedient to represent graphically the results of the measurement of the target current at the different scanning sites. To this end, an advantageous development of the teaching according to the invention provides for a display device connected to the evaluation device for the graphic representation of target current/scanning site values allocated to each other. In particular it is possible according to the invention to represent the target current/scanning site values in a triaxial coordinates system in which for example the current intensity of the target current over the areal extent of the target in X- and Y-directions is plotted on the Z-axis. A suitable graph can for example and in particular be represented in the manner of a pseudo-3D representation on the display device, with the result that it can easily be recognized whether and at what points the target is worn away.

In the aforementioned embodiment the display device can for example have a printer. An advantageous development of the teaching according to the invention provides in this respect that the display device has a screen.

Another advantageous development of the teaching according to the invention provides that the control device can be switched between an operating mode, in which the electron beam is directed essentially location-stable at the target in order to produce X-radiation, and an examination mode, in which the electron beam scans the target. The control device can be switched manually between the operating mode and the examination mode in this embodiment. However, as the scanning of the target by means of the electron beam and the measurement of the current intensity, allocated to the respective scanning site, of the target current can be carried out very quickly, it is also possible to automatically switch from the operating mode into the examination mode and back, for example at predefined time intervals or each time before an X-ray image sequence is recorded. If it is established in the examination mode that the target is worn away, a corresponding visual or acoustic warning signal can be emitted. In this way, the operational reliability of the X-ray tube is further increased, because there is automatic recognition that the target is worn and thus avoidance of an operation of the X-ray tube with a worn target.

The means for directing an electron beam at the target expediently include at least one deflector, by means of which the electron beam can be deflected along two axes perpendicular to each other and to the beam axis of the electron beam, in such a way that the target can be scanned in two dimensions by means of the electron beam. Suitable deflectors can for example be realized by coils or arrays of coils and also by electrostatic deflector plates. They are present in many X-ray tubes in any case.

The target expediently includes a base body consisting of a support material, which is at least partially coated with a target material. The support material can be for example beryllium or copper, while the target material can be for example tungsten. However, other target materials can also be used instead of tungsten, according to the desired wavelength of the X-radiation to be emitted.

A development of the method according to the invention provides that the measured value ascertained at a scanning site for the target current is compared—preferably by the evaluation device—with a predefined or predefinable threshold value. In this embodiment, the target can be classified as "in order" or "not in order" in the manner described. If for example a target is used the target material of which has a higher electron reflection than the support material, it is established—preferably in the evaluation device—whether the target current exceeds the threshold value, which indicates in the manner described above that the target is damaged. In this case the target can then be classified as "not in order". If, on the other hand, a target is used whose target material has a smaller electron reflection than the support material, it is established—preferably in the evaluation device—whether the target current lies below the threshold value, which indicates in the manner described above that the target is damaged. In this case the target can be classified as "not in order". According to the invention it is possible in principle to measure any measurement variable dependent on the current intensity of the target current. For example, according to the invention the dose rate of the X-ray tube can be measured by the measurement device, as the dose rate changes depending on the wearing away of the target layer and the change in the dose rate is thus correlated with a change in the current intensity of the target current.

However, a particularly advantageous development of the method according to the invention provides that the current intensity of the target current is measured directly—preferably by the measurement device. In this embodiment, the outlay on equipment in order to ascertain the measurement variable is particularly small. Instead of the current intensity, a measurement variable associated with the current intensity, for example a voltage dependent on the current intensity, can also be measured. It is for example also possible to measure, by means of a diaphragm, a current of electrons backscattered from the target.

The invention is explained in more detail below with reference to the attached, highly schematic, drawing in which an embodiment of an X-ray tube according to the invention is represented. All features claimed, described or represented in the drawing form, by themselves or in any combination with one another, the subject of the invention, regardless of their summary in the claims and regardless of their description or representation in the drawing.

BRIEF DESCRIPTION OF THE DRAWINGS

There are shown in.

DETAILED DESCRIPTION

Figure 1:
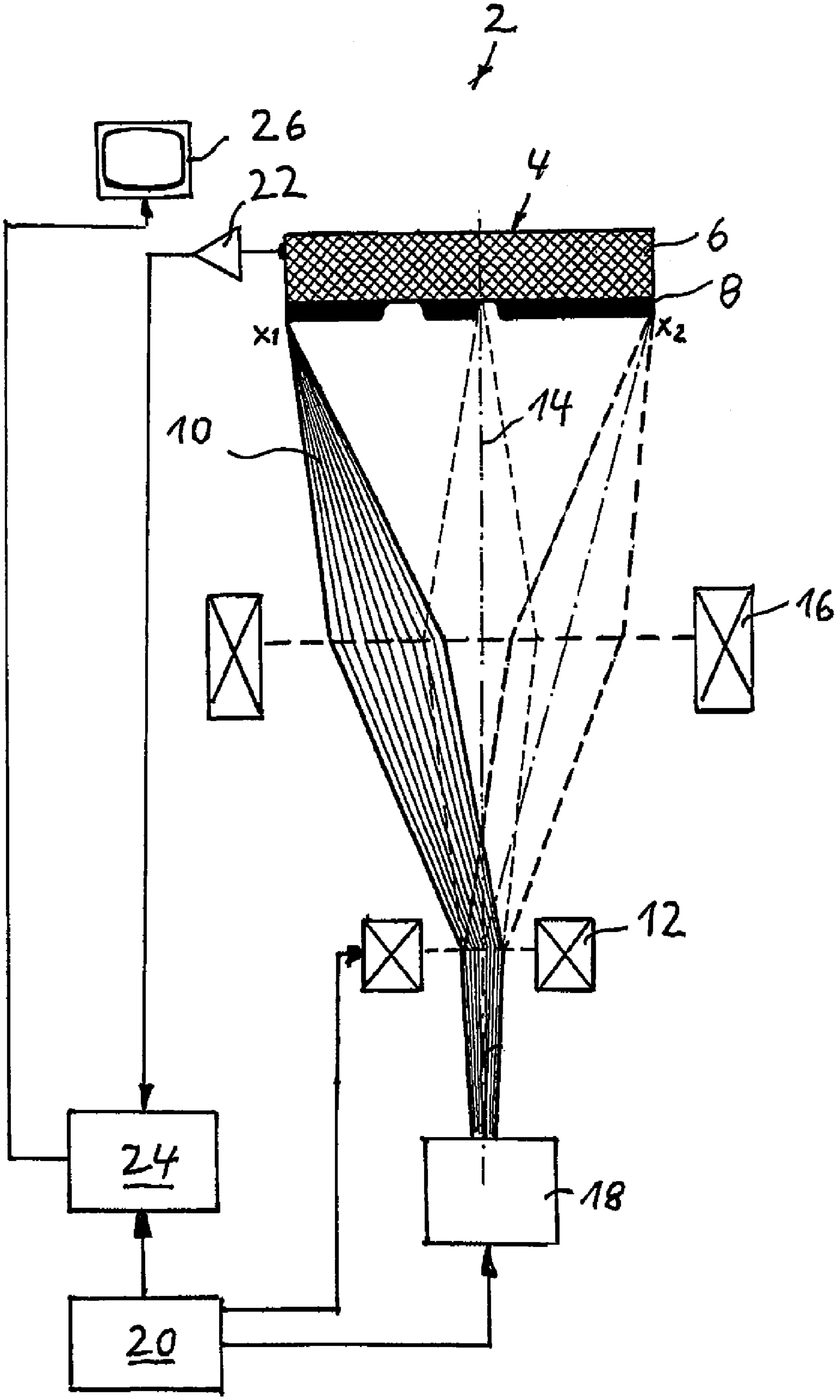
FIG. 1 a highly schematic view of components of an X-ray tube according to the invention, FIG. 2 a view and section through an intact target together with the spatial course of a target current resulting when this target is scanned with an electron beam and FIG. 3 a worn away target, in the same representation as FIG. 2.

In the figures, identical or corresponding components are given the same reference numbers. The drawing represents only those component groups of an X-ray tube which are needed to explain the teaching according to the invention. As the basic structure of an X-ray tube is generally known to a person skilled in the art, the component groups necessary in practice, for example a casing that can be evacuated in which the components of the X-ray tube are housed, are not shown in the drawing. Nor are they explained in more detail here.

FIG. 1 shows an embodiment of an X-ray tube according to the invention in the form of a microfocus X-ray tube 2 which includes a target 4. The target 4 has a base body 6, consisting of a support material, in this embodiment beryllium, to which a target layer 8, consisting of a target material, in this embodiment tungsten, is applied.

The X-ray tube 2 also has means for directing an electron beam, indicated by the reference number 10 in FIG. 1, at the target 4. The electron beam 10 can be deflected, by means of a deflector 12, which can be formed for example by a coil array, along two axes perpendicular to each other and to the beam axis 14, symbolized in FIG. 1 by a dash-dot line, of the electron beam 10. The electron beam 10 can thus be deflected by means of the deflector 12 in FIG. 1 in the horizontal and into the plane of projection and out of the plane of projection.

A focusing device 16 formed by a coil array is provided to focus the electron beam 10 on the target 10.

The means for directing the electron beam 10 at the target 4 are merely schematically indicated by the reference number 18 in FIG. 1. They can include, in the manner known to a person skilled in the art, for example a filament for releasing electrons and an accelerator formed by an anode-cathode array.

According to the invention, a control device 20 is also provided, by which the means 18 for directing the electron beam 10 at the target 4 can be driven in an operating mode of the X-ray tube 2 in such a way that the electron beam 10 strikes the target 4 essentially location-stable and in the process X-radiation is produced in the desired manner.

In the present example the control device 20 can be switched manually from the operating mode into an examination mode in which the target 4 can be examined In the examination mode, the control device 20 drives the deflector of the means 18 for directing the electron beam 10 at the target 4 in such a way that the electron beam 10 scans the surface of the target in two dimensions, namely in FIG. 1 along the horizontal and into the plane of projection and out of the plane of projection. The control means of the deflector 12 are driven in such a way that the electron beam just strikes the very edge of the target 4 in the extreme deflection positions.

According to the invention a measurement device 22 is also provided which, in this embodiment, is formed as a current-measurement device for the measurement of the current intensity of the target current which flows during the scanning of the target 4 with the electron beam 10 at different scanning sites. The measurement device 22 is only indicated symbolically in FIG. 1. Its structure is generally known to a person skilled in the art, and it will therefore not be explained in more detail here. With regard to the measurement of the target current, reference is made for example to DE 103 52 334 A1.

According to the invention, an evaluation device 24 is also provided for the allocation of the respective measured value for the target current, in the represented embodiment example of the respective current intensity of the target current, to the associated scanning site, i.e. the location where the electron beam is situated precisely on the target during the measurement of this current intensity. As can be seen from FIG. 1, the evaluation device 24 is connected to the measurement device 22 on one side and to the control device 20 on the other. In this embodiment example, it has a memory in which the target current/scanning site values that result during a scanning of the target 4 by means of the electron beam 10 are stored in time sequence.

In this embodiment a display device in the form of a screen 26 is provided to graphically represent the target current/scanning site values allocated to one another that are stored in the memory of the evaluation device 20.

The X-ray tube 2 according to the invention operates as follows:

To examine the target 4 of the X-ray tube 2, the control device 20 is first switched into the examination mode. In this examination mode, the control device drives the deflector 16 of the means 18 for directing the electron beam 10 at the target 4 in such a way that the electron beam 10 scans the surface of the target 4 in two dimensions. The scanning of the surface of the target 4 can take place either stepwise or continuously. During the scanning of the surface of the target 4 the measurement device 22 continuously measures the current intensity of the target current which flows during the scanning of the target 4 with the electron beam 10 at the various scanning sites. During the scanning the control device 20 continuously sends the evaluation device 24 signals which give rise to the scanning site at that moment, i.e. that point on the target 4 at which the electron beam 10 is specifically directed. At the same time, the measurement device 22 continuously sends the evaluation device 24 signals from which the current intensity of the respective measured target current results. The resulting target current/scanning site values are stored in the memory of the evaluation device 22. The scanning of the surface of the target 4 with the electron beam 10 is continued until the whole surface of the target 4 is scanned according to the chosen scanning resolution and an associated value of the current intensity of the target current is accordingly stored for every scanning site. The stored target current/scanning site values can then be represented for example on the display device 26.

Figure 2:
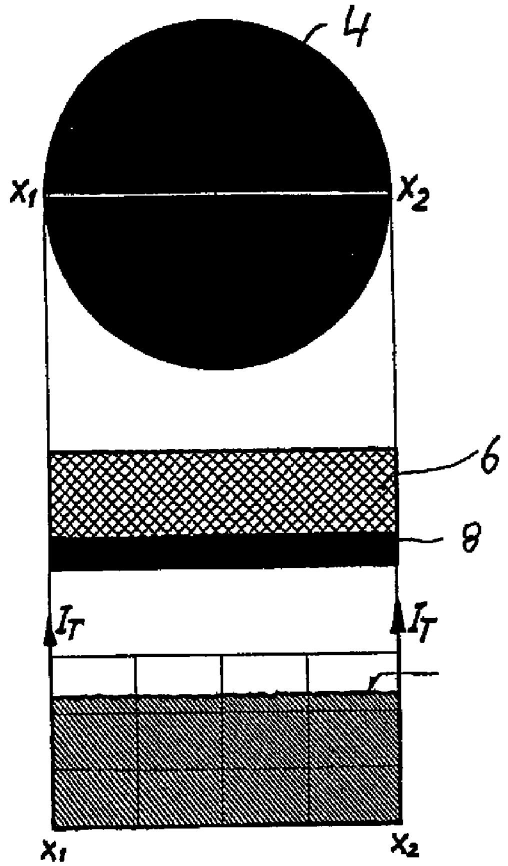

FIG. 2 shows at the top the surface of a target 4 that is not worn away. A section through the target 4 is represented in the middle of FIG. 2, wherein it can be seen that the target layer 8 arranged on the base body 6 has a uniform thickness in the direction of radiation of the electron beam and is thus not worn away.

If the surface of the target 4 is scanned for example along a linear path between the points $x_1$ and $x_2$ (see top of FIG. 1), a virtually identical target current flows at all scanning sites, as can be seen from the graphic representation at the bottom in FIG. 2, in which the current intensity of the target current $I_T$ over the scanning site is plotted. It can be seen from this course of the current intensity of the target current that the layer thickness of the target layer 8 is essentially constant along the linear scanning path.

Figure 3:
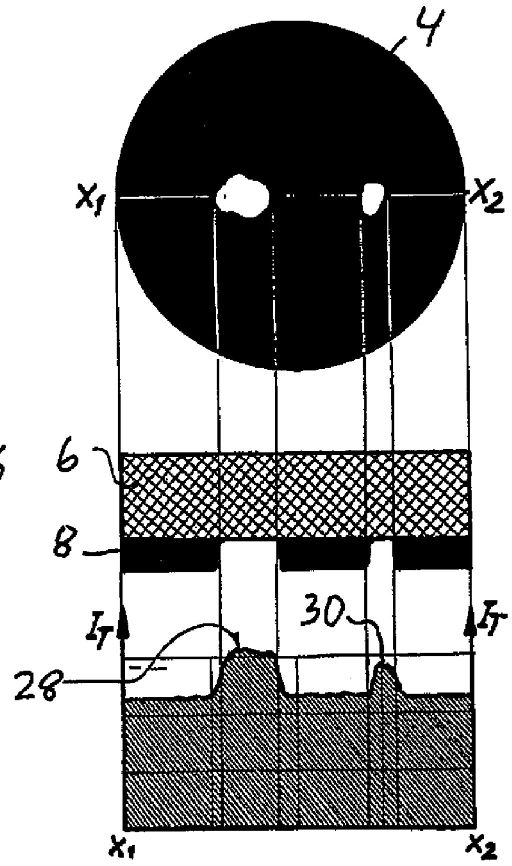

FIG. 3, on the other hand, represents a target in which the target layer 8 has been worn away at two points to such an extent that the support layer 6 is exposed (cf. in FIG. 3 at the top). A section through a target 4 worn away in such a manner is shown in the middle of FIG. 3.

During the scanning of the target along a scanning path, again linear, between points $x_1$ and $x_2$, the electron beam 10 strikes the base body 6 at the points where the layer 8 is worn away and the base body 6 is exposed. In this case a target current $I_T$ flows, the current intensity of which is clearly higher than the current intensity of a target current flowing in the case of an intact target layer 8, because tungsten has a higher electron reflection than beryllium. This can be seen from FIG. 3 at the bottom, where the course of the current intensity of the target current $I_T$ over the scanning path is plotted. The marked rise, shown in FIG. 3 at the bottom, in the current intensity of the target current (cf. reference numbers 28 and 30) shows that the target layer 8 is worn away at the associated scanning sites, with the result that the base body 6 is exposed.

A target 4 worn away to this extent can be replaced. As the degree of wear of the target 4 can be ascertained spatially resolved by means of the teaching according to the invention, it is also possible, however, to drive the deflector 16 in the operating mode of the X-ray tube 2 in such a way that the electron beam 10 is directed location-stable at a point on the target 4 that has not been worn away.

After the surface of the target 4 has been scanned by means of the electron beam 10, the control device 20 can be switched from the examination mode back into the operating mode. The target current/scanning site values obtained during the scanning can be represented, for example in the form of a pseudo-3D representation, on the display device 26.

The teaching according to the invention thus makes possible an examination of the target 4 of the X-ray tube 2 in a particularly simple way.

The invention claimed is:

1. An x-ray tube comprising:
- a directing device configured to direct an electron beam at a target;
- a control device configured to drive the directing device so as to cause the electron beam to scan the target;
- a measurement device configured to measure a value indicative of a current intensity of a target current flowing during a scanning of the target at a plurality of scanning sites; and
- an evaluation device configured to allocate each respective value to the respective scanning site
- wherein the control device includes a switching device configured to switch the control device between an examination mode for scanning the target to recognize damage of the target layer at a respective scanning site and an operating mode directing the electron beam at the target in a location stable manner so as to produce X-radiation.

2. The x-ray tube as recited in claim 1, wherein the x-ray tube is a micrufocus x-ray tube.

3. The x-ray tube as recited in claim 1, wherein the evaluation device includes a memory configured to store the values and the respective scanning site values.

4. The x-ray tube as recited in claim 1, further comprising a display device connected to the evaluation device configured to graphically represent the values and the respective scanning site values.

5. The x-ray tube as recited in claim 4, wherein the display device includes a screen.

6. The x-ray tube as recited in claim 1, wherein the switching device includes at least one deflector configured to deflect the electron beam along two axes perpendicular to each other and to a beam axis of the electron beam so as to scan the target in two dimensions.

7. The x-ray as recited in claim 1, wherein the target includes a base body including a support material and at least partially coated with a target material.

8. A method for examining a target of an x-ray tube comprising:
- scanning a target of the x-ray tube with an electron beam;
- measuring a value indicative of a current intensity of a target current flowing at a plurality of scanning sites during the scanning of the target;
- allocating each measured value to the respective scanning site;
- directing the electron beam at the target in a location stable manner so as to create X-rays in an operation mode; and
- scanning the target with the electron beam in an examination mode, wherein damage of the target layer at a respective scanning site is recognized in the examination mode by the current intensity of the target measured at the respective scanning site.

9. The method as recited in claim 8, further comprising storing the values and the respective scanning site values in a memory.

10. The method as recited in claim 8, further comprising comparing the values and the respective scanning site values with a predefined or predefinable threshold value.

11. The method as recited in claim 8, wherein the measuring the current intensity includes measuring the current intensity directly.

12. The method as recited in claim 8, further comprising representing the values and the respective scanning site values graphically.

13. The method as recited in claim 8, further comprising deflecting the electron beam using a deflector along two axes perpendicular to each other and to a beam axis of the electron beam, so as to scan the target in two dimensions.

14. The method as recited in claim 8, wherein the target includes a base body including a support material and at least partially coated with a target material.

* * * * *